Figure 1:
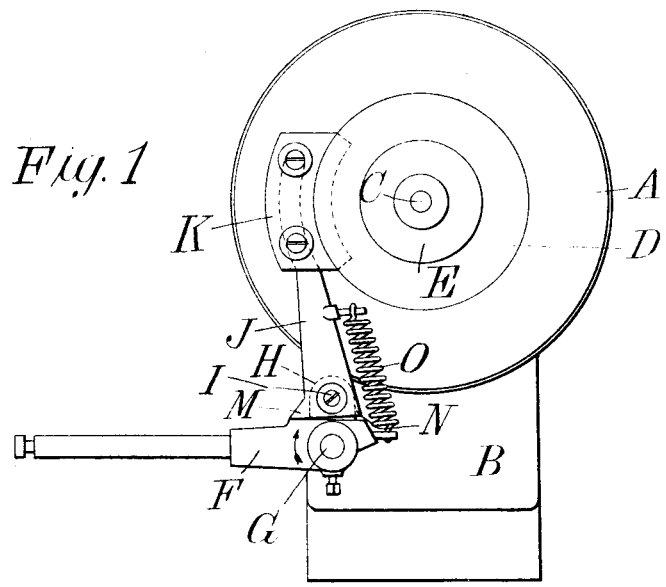

C. P. BANZHOF.
ELECTRIC MOTOR DRIVE MECHANISM.
APPLICATION FILED JULY 3, 1911.

1,033,519.

Patented July 23, 1912.

2 SHEETS—SHEET 1.

Witnesses
Joseph C. Black
R. W. Bishop

Inventor
Charles P. Banzhof
By Julian C. Dowell
his Attorney

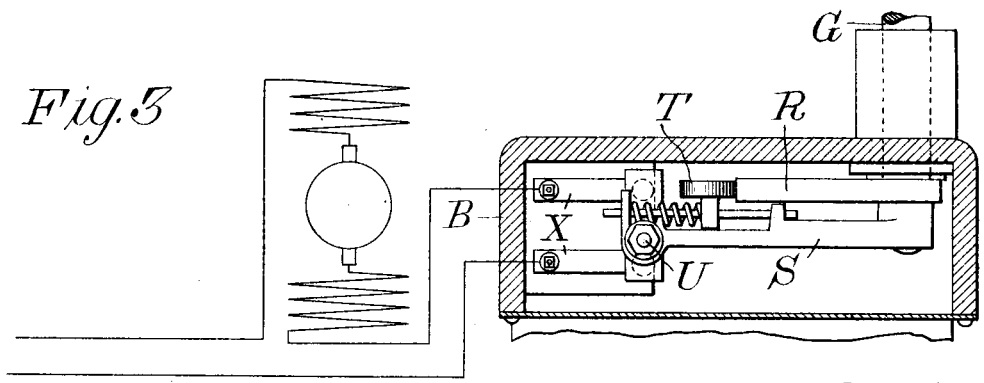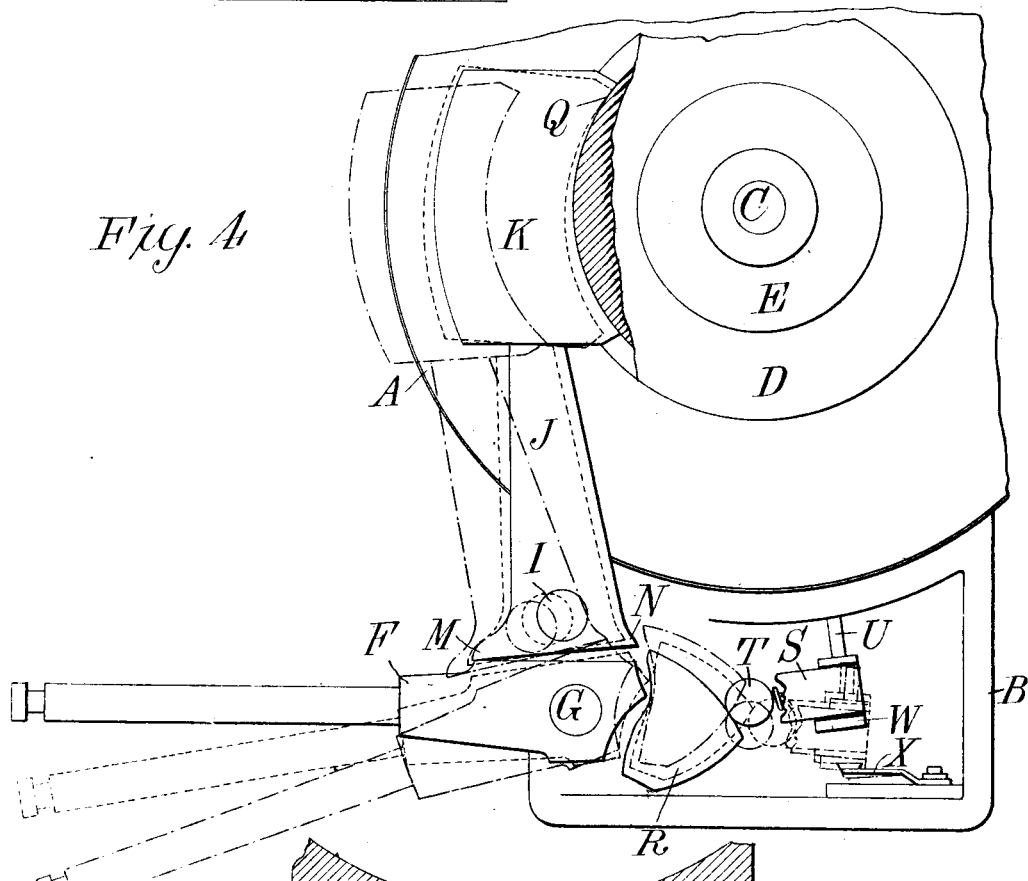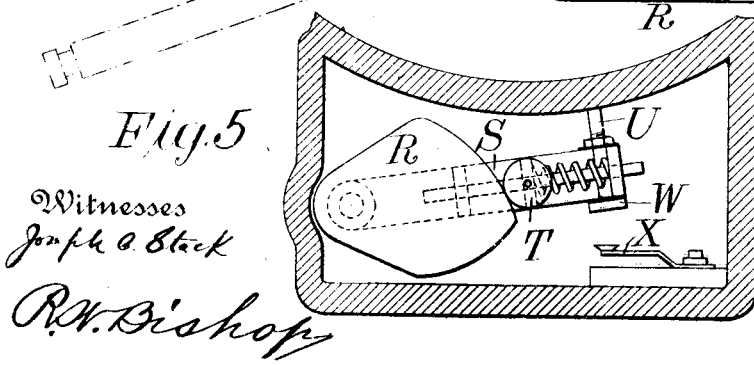

UNITED STATES PATENT OFFICE.

CHARLES P. BANZHOF, OF LANCASTER, PENNSYLVANIA, ASSIGNOR TO B. GRANT STAUFFER, CHARLES F. STAUFFER, AND LEVI W. HORTING, ALL OF LANCASTER, PENNSYLVANIA.

ELECTRIC-MOTOR DRIVE MECHANISM.

1,033,519.      Specification of Letters Patent.      Patented July 23, 1912.

Application filed July 3, 1911. Serial No. 636,754.

*To all whom it may concern:*

Be it known that I, CHARLES P. BANZHOF, a citizen of the United States, residing at Lancaster, in the county of Lancaster and State of Pennsylvania, have invented certain new and useful Improvements in Electric-Motor Drive Mechanism, of which the following is a specification.

An important application of the electric current for running machinery has been the light motor drive such as required for sewing and other light machines.

It is to this class of electric motor drive that the present invention relates, and the object is to provide a self-contained apparatus, the speed of which can be easily controlled within its limits, which can be brought to a quick full stop, and which can be readily applied to the machine it is intended to operate.

Heretofore in the application of the light electric motor drive, especially in sewing machine use, the most common means of obtaining speed control has been by belt slippage, using a constant speed motor belted loosely to the driven pulley, with provision for tightening the belt in a varying degree. This method requires frequent belt renewals, on account of the rapidly revolving motor pulley slipping under the belt, and its proper application requires the use of a constant speed motor which for direct current must be of one design and for alternating current another design.

In my improvement, I obtain speed control by the application of a variable brake to the motor shaft, as hereinafter described, and I use a motor of the series wound type, through the well known speed characteristics of which the braking of the armature shaft is made practical, and which by proper designing can be made to operate satisfactorily on both direct and alternating current.

In its preferred form, my improvement comprises a motor frame provided with a laminated field member, an armature journaled to revolve therein, a brake wheel or pulley fast on the armature shaft and provided with a peripheral V-groove, a wedge-shaped brake held by spring-action in engagement with said V-groove, and means for applying and varying the pressure of said brake in said V-groove comprising a spring-actuated operating lever fulcrumed on the motor frame and a spring-actuated brake-lever with limited motion in either direction fulcrumed on said operating lever, together with means for opening the electric circuit before the brake is fully applied and closing the circuit after the brake is partly released.

The invention will be explained by reference to the accompanying drawings, and will be particularly pointed out in the appended claims.

Figure 2:
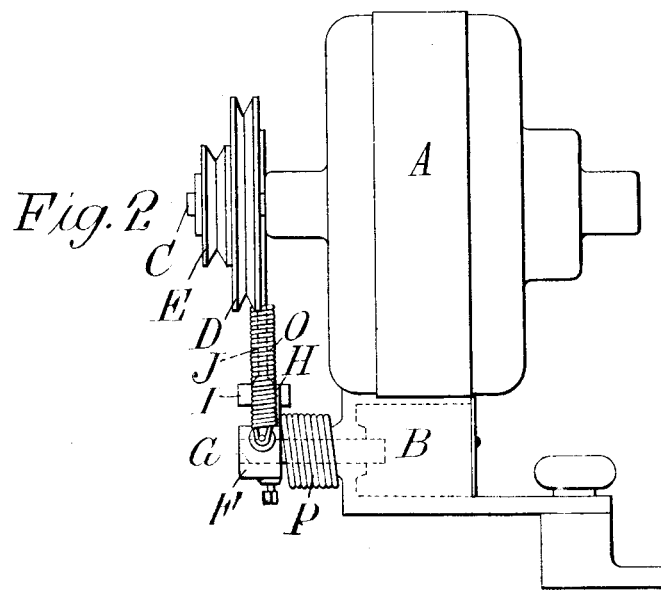

In said drawings: Figure 1 is a front elevation of an apparatus embodying our invention. Fig. 2 is a side elevation, looking at the right hand side of Fig. 1. Fig. 3 is a horizontal section of the hollow base of the motor frame showing the switch in plan, and illustrating the motor connections diagrammatically. Fig. 4 is a diagrammatic view illustrating the action of the mechanism in practical operation, different positions of the brake, levers and switch mechanism being indicated by full, dot and dot-and-dash lines. Fig. 5 is a vertical section through the base of the motor frame, showing the switch mechanism in elevation.

In the drawings, A designates the motor frame which is rigidly attached to a hollow base B.

C is the armature shaft journaled to revolve in the motor frame. Fast on shaft C is the brake wheel or pulley D having a peripheral V-groove; also a grooved pulley E for communicating power by belt, though of course the power transmission may be by direct connection instead of by belt.

F is the operating instrumentality or lever which is fast to and fulcrumed on a stud G journaled in the base B. Said stud G extends into the hollow base and is operatively connected with the switch mechanism. On the operating lever F is a rigid upwardly-projecting arm H carrying a stud I upon which is fulcrumed the brake-lever J. The last-mentioned lever carries the brake K, having a segmental or arcuate wedge-shaped braking surface for engagement with the V-groove of the brake-pulley D. Said brake-lever J is allowed a limited movement on stud I in either direction, being so limited by contact of surfaces or stops M and N against the operating lever F. A tension spring O, attached to the brake lever and to the fulcrum end of the operating lever, tends to move the brake lever to the limit N. Surrounding stud G, with its ends attached respectively to the operating lever and to the base of the motor frame, is a stronger helical spring P tending by torsion to turn stud G in the direction indicated by the arrow in Fig. 1 and thereby force the operating lever and parts carried thereby in a direction to fully apply the brake.

The normal position of the parts, when at rest, is shown by the full lines in Fig. 4. This is the off position, and the electric circuit to the motor is open through the action of the switch as hereinafter described. Under influence of spring P the operating lever F holds the stud I, on which the brake lever J is fulcrumed, in an inward position, and as the brake lever is restrained by engagement of brake K with pulley D, said brake lever J is held in the position shown with brake K squarely engaging the V-groove of the brake wheel or pulley and limit M in contact with F. Spring O, which is made lighter than spring P, is held under extreme tension, and the full force of spring P is exerted on the brake. If, now, the operating lever F is depressed to the position indicated by dotted lines in Fig. 4, the stud I constituting the fulcrum of the brake lever J will shift accordingly, but the contraction of spring O will hold the brake against the brake wheel or pulley D. This causes the brake lever to turn on its fulcrum, clearing the limit M from contact with F; and the change of relative position of the brake-lever withdraws the brake K partially from the V-groove of the pulley, leaving it in engagement only at Q. If the operating lever F is further depressed, the brake lever J will continue to turn on stud I, under action of spring O, until F engages the limit N, when the turning movement of said brake lever will be stopped; and, if depression of the operating lever be continued to the position indicated by dot-and-dash lines in Fig. 4, lever F abutting against N will swing lever J outward, carrying brake K clear of pulley D as shown.

As previously noted, the end of stud G extends into the hollow base B and is operatively-connected with the switch mechanism. The switch is connected electrically in series with the motor windings, and is so adjusted that it will open and remain open while the brake is under the influence of spring P, and will close and remain closed while the brake is under the influence of spring O. For this purpose I preferably employ a quick-acting switch of the general type or character disclosed in U. S. Patent to Horting, No. 971,843, dated Oct. 4, 1910, which is applied as follows: As represented in Figs. 3 and 5, a cam R is rigidly affixed on the stud G, and a lever S is pivoted on said stud so as to be independently movable. Said lever S carries in guides a spring-actuated roller T which is forced by the spring against the cam, the latter presenting opposite oblique curved surfaces to the roller. A pin U carried by the lever S limits its upward throw. Said lever S also carries a flat contact plate or spring W, separately insulated therefrom. When the lever is thrown down, said spring W will bridge across and make electrical connection between the separately insulated contact springs X, which as indicated diagrammatically in Fig. 3 are connected in series with the series wound motor.

Referring again to the diagrammatic view in Fig. 4, it will be seen that when the brake is fully applied, the switch is open. In this position the roller T, bearing against the upper oblique surface of the cam R, holds the lever S up to a position limited by abutment of the pin U against the motor base, with the bridging spring W clear of contact springs X as shown in full lines. The relation of the parts is such that when the operating lever F is depressed enough to clear it from contact with the brake lever J at M, the peak of the cam R is carried past the line of motion of the roller T in the off position, causing the roller to roll against the other or lower oblique surface of the cam and thereby throwing down the lever S to the position indicated by dotted lines, which closes the switch by making contact between W and X. The operating lever F may now be depressed to the full speed position indicated in Fig. 4 by the dot-and-dash lines without affecting the switch, as the roller T will simply ride on the lower oblique surface of the cam as the latter moves to the dot-and-dash line position. If, however, the operating lever is allowed to return to the off position, the resulting movement of the cam will carry its peak past the line of motion of the roller in the on position and again present the upper oblique surface of the cam to the roller, thus throwing up the lever S and opening the switch. The adjustment of the parts is such that in this return movement of the cam its upper oblique surface is presented to the roller just before the operating lever F abuts against the point M on the brake lever J, so that the switch opens before the brake is fully applied. Instability of the roller when on the peak of the cam may be increased by allowing the roller-carrying plunger to wabble, or allowing a slight independent movement of the cam, or both, as and for the purposes explained in the specification of the patent aforesaid.

From the foregoing description, it will be seen that when the operating lever F is depressed, brake K will be partly released, the switch will close, and the motor, being properly connected to an electrical circuit, will start, though it will be restrained from full speed by the brake. As said brake when applied in the running position is actuated solely by spring O, which is weakened as depression of lever F continues, and as said brake is released gradually from one end during such depression, the friction of said brake can be made to vary at will, thus obtaining any motor speed from maximum to minimum. Also it will be seen that when the depressing force on lever F is removed, the switch will first be opened and then the brake fully applied, and the motor will come to a full stop with the electric circuit open.

In order to obtain the best results in my improvement, I preferably use a series wound motor so proportioned as to consume practically the same electric power with the brake partly applied for minimum speed as it consumes when running at maximum speed. This is readily done as in the class of drive contemplated the load increases with the speed and thus speed control by my improvement resolves itself into a shifting of power from load to the brake and vice versa.

The invention may be embodied in other forms than that selected for illustration, and the details of construction and arrangement may be variously modified; hence I do not restrict myself to the specific construction herein shown and described.

I claim as my invention and desire to secure by Letters Patent:

1. An electric motor drive mechanism having, in combination, a series wound motor and speed control means mounted on the motor frame comprising a variable brake acting on the armature shaft and an operating instrumentality controlling the application of the brake.

2. An electric motor drive mechanism having, in combination, a series wound motor, speed control means comprising an operating instrumentality and a brake controlled thereby for variable application to the armature shaft, and a switch controlled by said operating instrumentality for opening the electric circuit through the motor before the brake is fully applied and for closing said circuit when the brake is partly released.

3. A drive mechanism comprising an electric motor, the armature shaft of which is provided with a brake wheel fast thereon, an operating instrumentality, and a brake movably mounted on the operating instrumentality for variable application to the brake wheel and controlled by said instrumentality within the limits of its own variability; said instrumentality being adapted to effect a full release or full application of the brake.

4. A drive mechanism comprising an electric motor, a spring-actuated brake acting on the armature shaft and arranged for variable application, and a spring-actuated operating instrumentality acting on said brake and normally holding it fully applied, said operating instrumentality adapted when displaced against the resistance of its spring to control the variable application of said brake under influence of the spring of the latter.

5. The combination with an electric motor, speed control means mounted on the motor frame and comprising a brake acting on the armature shaft and an operating instrumentality holding said brake applied and adapted to withdraw the same, said brake being capable of a limited movement relative to said operating instrumentality which movement is controlled by the movement of said operating instrumentality for varying the application of the brake between the limits of its full application and full release.

6. In combination with an electric motor, speed control means comprising an operating instrumentality and a brake for the armature shaft movably-connected to said operating instrumentality for limited relative movement and controlled thereby for variable application within certain limits and adapted to be fully applied and fully released by said operating instrumentality.

7. In combination with an electric motor, speed control means comprising an operating instrumentality and a brake for the armature shaft movably-connected to said operating instrumentality for a limited relative movement and controlled thereby for variable application within certain limits and adapted to be fully applied and fully released by said operating instrumentality, and a switch controlled by said operating instrumentality for opening the electrical circuit through the motor before the brake is fully applied and closing said circuit when the brake is partially released.

8. In combination with an electric motor, speed control means comprising an operating instrumentality and a brake for the armature shaft movably-connected to said operating instrumentality for limited relative movement and controlled thereby for variable application within certain limits and adapted to be fully applied and fully released by said operating instrumentality, and a switch controlled by said operating instrumentality to close the circuit through the motor when the limited free movement of said brake for releasing begins and opening said circuit at approximately the same period of the reverse movement.

9. In combination, an electric motor and speed control means comprising an operating instrumentality and a spring-actuated brake for the armature shaft carried by and having a limited free movement relative to said operating instrumentality.

10. An electric motor having speed control means comprising a spring-actuated operating instrumentality mounted on the motor frame and a brake for the armature shaft carried by and capable of a limited free motion relative to said operating instrumentality.

11. An electric motor having speed control means comprising a spring-actuated operating lever mounted on the motor frame and a spring-actuated brake for the armature shaft carried by and capable of a limited free movement relative to said operating lever.

12. In an electric motor drive mechanism, a motor frame, an armature journaled to revolve therein, a brake wheel with peripheral V-groove fast on the armature shaft, a wedge shaped brake for engaging said V-groove, and means for applying and varying the pressure of said brake in said V-groove.

13. In an electric motor drive mechanism, a motor frame, an armature journaled to revolve therein, a brake wheel with peripheral V-groove fast on the armature shaft, a wedge-shaped brake for engaging said V-groove, and means for applying and varying the pressure of said brake in said V-groove comprising a spring-actuated operating lever mounted on the motor frame and a spring-actuated brake-applying lever fulcrumed on said operating lever.

14. In an electric motor drive mechanism, a motor frame, an armature journaled to revolve therein, a brake-wheel with peripheral V-groove fast on the armature shaft, a wedge-shaped brake for engaging said V-groove, and means for applying and varying the pressure of said brake in said V-groove, comprising a spring-actuated operating lever mounted on the motor frame and a spring-actuated brake-applying lever fulcrumed on said operating lever, said brake-applying lever having a limited movement on and relative to said operating lever.

15. In an electric motor drive mechanism, a motor frame, an armature journaled to revolve therein, a brake wheel fast on the armature shaft, a brake having a segmental or curved surface for engaging the periphery of said brake wheel, and means for releasing said brake from one end and thereby varying its application.

16. In an electric motor drive mechanism, a motor frame, an armature journaled to revolve therein, a brake wheel fast on the armature shaft, provided with a peripheral V-groove, a brake having a segmental or curved wedge-shaped braking surface and spring-held in engagement with said V-groove, and means controlling the brake for applying and releasing it from one end.

17. In an electric motor drive mechanism, a motor frame, an armature journaled to revolve therein, a brake wheel fast on the armature shaft, a brake in frictional engagement with said brake wheel, and means for applying and varying the pressure of said brake comprising a spring-actuated operating lever fulcrumed on the motor frame and a spring-actuated brake lever with limited motion in either direction fulcrumed on said operating lever.

18. In an electric motor drive mechanism, a motor frame, an armature journaled to revolve therein, a brake wheel fast on the armature shaft, a brake in frictional engagement with said brake wheel, and means for applying and varying the pressure of said brake comprising a spring-actuated operating lever fulcrumed on the motor frame and a spring-actuated brake lever with limited motion in either direction fulcrumed on said operating lever, and means for opening the electric circuit before said brake is fully applied and closing said circuit after said brake is partly released.

19. In an electric motor drive mechanism, a motor frame, an armature journaled to revolve therein, a brake wheel fast on the armature shaft, a brake engaging said brake wheel, and means for applying and varying the friction of said brake on said brake wheel comprising an operating lever fulcrumed on the motor frame and a brake lever with limited movement in either direction fulcrumed on said operating lever and controlled thereby to vary the surface of contact of said brake against said brake wheel.

20. In an electric motor drive mechanism, a motor frame, an armature journaled to revolve therein, a brake wheel fast on the armature shaft, a brake engaging said brake wheel, and means for applying and varying the friction of said brake on said brake wheel comprising an operating lever fulcrumed on the motor frame and a brake lever with limited movement in either direction fulcrumed on said operating lever and controlled thereby to vary the surface of contact of said brake against said brake wheel, and means for opening the electric circuit before said brake is fully applied and closing said circuit after the brake is partly released.

21. In an electric motor drive mechanism, a motor frame, an armature journaled to revolve therein, a brake wheel fast on the armature shaft, an operating lever fulcrumed on the motor frame, and a brake engaging said brake wheel and having limited movement relative to said operating lever and controlled thereby for varying its surface of contact against said brake wheel.

22. In an electric motor drive mechanism, a motor frame, an armature journaled to revolve therein, a brake wheel fast on the armature shaft, a brake engaging said brake wheel, means for applying and varying the action of the brake comprising a spring-actuated operating lever and a spring-actuated brake lever with limited motion in either direction fulcrumed on said brake lever, and switch mechanism including a peaked cam movable with said operating lever and a quick make-and-break lever carrying a spring-actuated roller bearing against said cam.

23. In combination, an electric motor, a brake therefor, an operating lever controlling said brake, and a switch including a peaked cam movable by said operating lever and a co-fulcrumed quick make-and-break lever carrying a spring-actuated roller bearing against said cam.

24. The combination of a driven wheel, a brake shoe coöperating therewith, a carrier on which said brake shoe is pivotally mounted, and a spring arranged to move said brake shoe on its pivot independently of said carrier and move its center of gravity constantly toward said driven wheel, whereby said shoe exerts a variable and increasing pressure as it is moved by the carrier toward the wheel and a variable and decreasing pressure as it is moved by the carrier away from said wheel.

25. The combination of a driven wheel, a brake applying lever, a brake shoe coöperating with the wheel and movably mounted on said lever, and a spring arranged to move said shoe independently of said lever and move its center of gravity constantly toward said driven wheel, whereby a variable and increasing pressure is exerted by said shoe as it is moved by the lever toward the wheel, and a variable and decreasing pressure as it is moved away from the wheel.

In testimony whereof I affix my signature, in presence of two witnesses.

CHARLES P. BANZHOF.

Witnesses:
EDW. GERLACH,
M. C. STONER.

---

Copies of this patent may be obtained for five cents each, by addressing the "Commissioner of Patents, Washington, D. C."